June 25, 1968  A. E. ANTUNEZ, JR  3,389,887
FLOAT VALVE
Filed Nov. 25, 1964  2 Sheets-Sheet 1
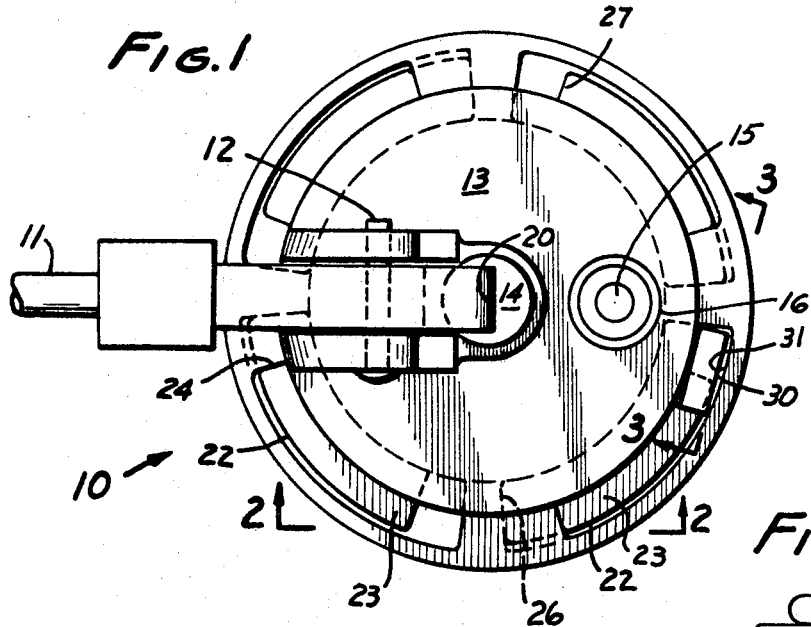
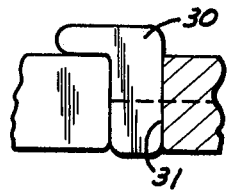
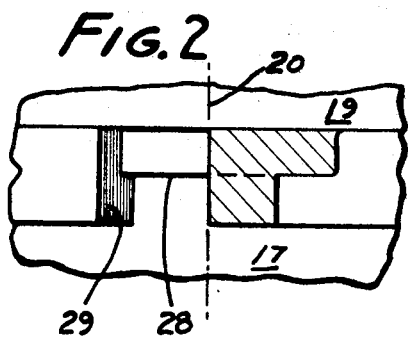
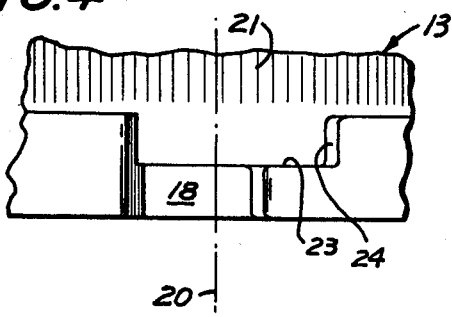
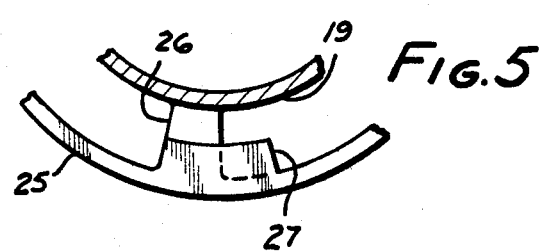
INVENTOR.
ARMAND E. ANTUNEZ, JR.,
BY
ATTORNEYS.

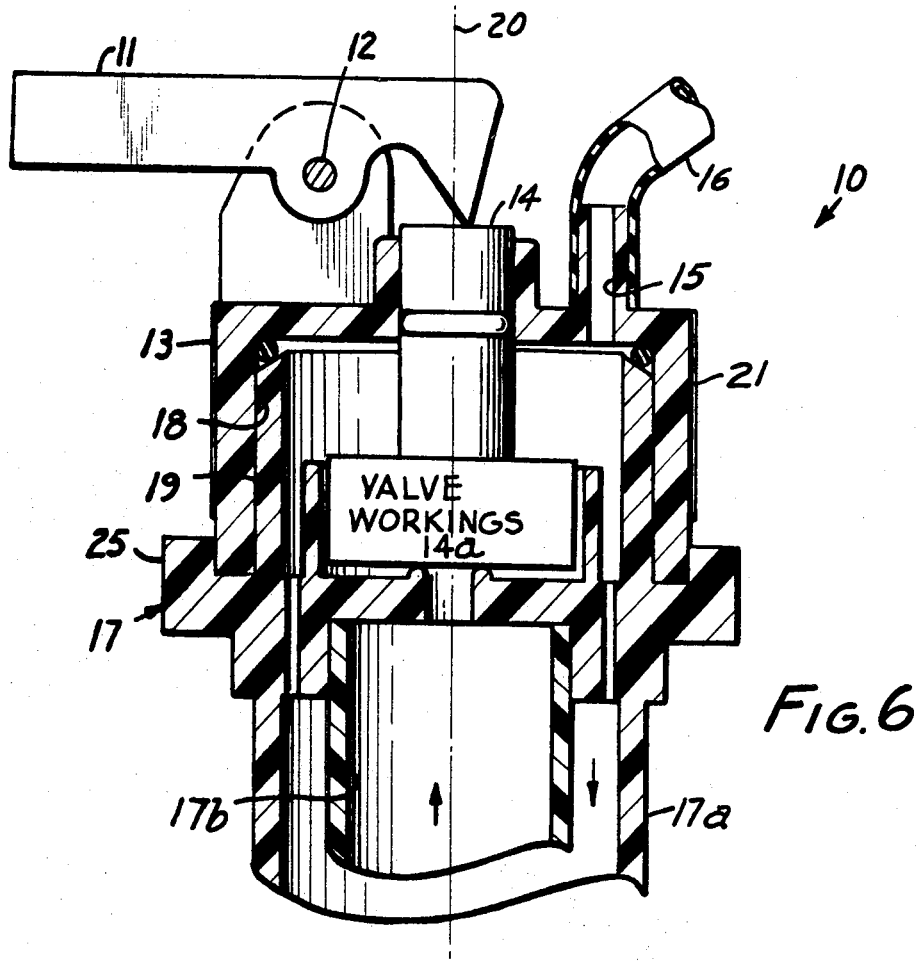

United States Patent Office 3,389,887
Patented June 25, 1968

3,389,887
FLOAT VALVE
Armand E. Antunez, Jr., Glendora, Calif. (% Coast Foundry & Mfg. Co., 2700 E. 1st St., La Verne, Calif. 91750)
Filed Nov. 25, 1964, Ser. No. 413,936
4 Claims. (Cl. 251—367)

This invention relates to flush valves.

Flush valves of the type which are attached to a vertically upstanding supply pipe within a tank and which utilize a lever-mounted float to control a valve that establishes the level of the water in the tank are well known. One well-known example is that shown in Antunez Patent No. 3,070,118, issued Dec. 25, 1962. A common feature of valves of this type is that they include a base and a cap which together enclose the workings of the flush valve. Generally the cap is held to the base by screws or other types of fasteners which are subject to loosening, to stretching under the forces exerted by the internal pressure of the water, and to corrosion. These therefore comprises a frequent source of trouble for the valve, and shorten its life.

It is an object of this invention to provide means for joining the cap and the base which are integral with the respective cap and base members, and which do not require external fastener means such as screws, nut-bolt assemblies, and the like for their operation.

This invention is used in combination with the base member and a cap member of a flush valve, and includes a circularly cylindrical centering surface on each of the members to prevent the members from moving relative to each other laterally to an axis around which they are relatively rotatable. The centering surfaces make a telescopic engagement of substantial axial extent, and align the two members, and prevent them from canting relative to each other. Engagement surfaces are provided on the two members, which members face each other when they are in a proper relative axial position. When the two members are rotated relative to each other, the engagement surfaces abut each other and prevent the separation of the two members.

According to a preferred but optional feature of the invention, each of the members is provided with a stop surface which stops the relative rotation in a position where the members are firmly locked together.

According to still another preferred but optional feature of the invention, the device is provided with a key pin which is interposed between portions of the members so as to prevent their being relatively rotated to a position where they might come apart.

The above and other features of this invention will be fully understood from the following detailed description in which:

FIG. 1 is a top view of the presently preferred embodiment of the invention;

FIGS. 2 and 3 are cross-sections taken at lines 2—2 and 3—3, respectively, of FIG. 1;

FIG. 4 is a fragmentary elevation of the cap member;

FIG. 5 is a fragmentary cross-section of a portion of the base member; and FIG. 6 is an axial cross-section of the valve of FIG. 1.

A float valve 10 is shown in FIG. 1 which is of the general class illustrated in the aforesaid Antunez Patent No. 3,070,118. Because of the similarity between the internal workings and the connections to stand pipes and the like, no detailed description of the internal workings nor of the attachment means to the pipe are shown here. Instead, there are merely shown the conventional lever 11 and hinge 12 which are pivotally mounted to cap member 13. A float, not shown, is mounted to the left-hand end of lever 11. The right-hand end of lever 11 presses against shaft 14, which is a valve operator for valve workings 14a.

Port 15 through the cap member connects with a hose 16 which is led to the overflow pipe so as to fill the toilet bowl after flushing.

The cap member is intended to be mounted to a base member 17 which is shown only fragmentarily in FIG. 2, and more fully in FIG. 6. Customarily, this includes a tubular member 17a which surrounds an internal supply pipe 17b, the function of the valve being to send the major portion of the flow down the space between the two, and into the reservoir tank.

The purpose of this invention is to join the cap member and the base member in a manner which does not require external fastening means which are subject to corrosion, stretching and the like. This is accomplished by forming unitarily with the cap member and the base member certain inter-engaging surfaces. FIGS. 4 and 6 illustrate these means, and especial attention is called to FIG. 6, wherein an internal circularly cylindrical centering surface 18 in the cap member is shown making a telescopic fit for a substantial axial extent with an external circularly cylindrical centering surface 19 on the base member. These centering surfaces are intended to engage each other telescopically when the cap member is placed over the base member, and the centering surfaces, which may conveniently be peripheral and cylindrical, prevent relative lateral movement and canting (which is a lateral motion also involving angular tilting) between the cap member and the base member with respect to axis 20 about which the cap member and base member are relatively rotatable.

As best shown in FIG. 4, the cap member includes a knurled outer surface 21 which can be gripped by the user to aid in turning it, and has a plurality of lugs 22 formed on its external surface which carry engagement surfaces 23 and optional stop surfaces 24.

Cooperating and complementary surfaces are provided on the base member as best shown in FIGS. 2 and 5. As best shown in FIG. 5, a ring 25 is supported by a plurality of spokes 26, and the inside of the ring bears a plurality of projections 27. Each of the projections, as shown in FIG. 2, bears an engagement surface 28 and an optional stop surface 29. Engagement surfaces 23 and 28 lie in planes normal to the axis of the device. When separative force is applied, there is no component of force tending to rotate one member relative to the other. These surfaces are equal in number, and preferably in angular subtense, to those on the cap member. As can best be seen from FIGS. 2 and 3, the total angular subtense of each of the sets of engagement surfaces is less than one-half the total periphery in order that the lugs may be moved past the projection and then turned. This is the means for assembly.

The lugs are first aligned with the openings formed between the base and the ring and moved axially until the engagement surfaces have axially passed each other. Then the cap is turned and the engagement surfaces abut each other to prevent axial separation. When stop surfaces are provided, the cap is turned until they strike each other, which firmly and finally defines the relative rotational position of the cap member and the base member. Then a key pin 30 may be placed in any gap 31 between a projection and a lug to prevent negative relative rotation of the two members, and the device is held firmly in the locked condition. The term "negative" rotation means that which tends to unlock the assembly.

It will be seen from the foregoing that this device includes a lug-type lock which enables the two portions of a flush valve quickly and expediently to be attached by means which are integral with the members themselves, which present no problem of corrosion or stretching under pressure, and which are simple and inexpensive to manufacture. When the inside of the valve requires servicing, it is only necessary to remove the key pin, rotate the cap and remove it, replace the internal workings, and then reverse the disassembly procedure to put the device together again.

This invention is not to be limited by the embodiment shown in the drawings and described in the description which is given by way of example and not of limitation, but only in accordance with the scope of the appended claims.

I claim:

1. In combination: a base member and a cap member; said base member having a valve seat formed thereon, said base member and said cap member enclosing a valve head member therein, said cap member further including a pivotal support for a float arm for operating said valve head member, and means for joining the members comprising: a centering surface on the base member and a centering surface on the cap member, said centering surfaces being substantially equidistant from a central axis around which the members are relatively rotatable, and which centering surfaces are circularly cylindrical and make a close-fitting, telescopic engagement for a significant axial extent, thereby to restrain the members against relative lateral movement including canting; an engagement surface on the cap member and an engagement surface on the base member, each of said engagement surfaces occupying less than one-half of the periphery around the axis, and both of them including portions which are equidistantly spaced from the said axis, whereby the members may be relatively moved axially to engage the centering surfaces while the engagement surfaces are rotationally displaced from each other, thereby moving the engagement surfaces to a mutually axially overlapping position, and thereafter relatively rotating the members while in this axial position so that the engagement surfaces overlap each other radially and thereby prevent separation of the members; and key means engageable to one of said members to prevent reverse relative rotation of the members.

2. Apparatus according to claim 1 in which the engagement surfaces project radially from their respective member, the engagement surfaces being located adjacent to an axial extreme of the respective centering surfaces, and lying in planes normal to said central axis.

3. Apparatus according to claim 2 in which a stop surface is provided on each of said members to limit relative rotation between the members.

4. Apparatus according to claim 2 in which a plurality of said engagement and stop surfaces is provided, the total angular subtense of each of the sets totaling less than 180° of the periphery.

References Cited

UNITED STATES PATENTS

| | | | |
|---|---|---|---|
| 1,275,718 | 8/1918 | Miller | 251—147 |
| 1,832,243 | 11/1931 | Ritchie | 251—147 |
| 1,887,235 | 11/1932 | Cornelius | 137—436 |
| 2,034,933 | 3/1936 | Wilson | 251—149.9 X |
| 2,165,163 | 7/1939 | Waters | 285—91 |
| 2,250,199 | 7/1941 | Kelly | 285—91 X |
| 2,779,350 | 1/1957 | Owens | 137—436 X |
| 2,829,907 | 4/1958 | Gill | 251—149.5 |
| 2,879,081 | 3/1959 | Keehn | 251—149.5 X |
| 2,986,155 | 5/1961 | Doyle | 137—436 X |
| 3,207,170 | 9/1965 | Fulton | 137—436 X |

M. CARY NELSON, *Primary Examiner.*

SAMUEL SCOTT, *Examiner.*